United States Patent
Lahmer (10) Patent No.: US 11,358,516 B2
(45) Date of Patent: Jun. 14, 2022

(54) VEHICLE HEADLAMP AND VEHICLE CONTROL

(71) Applicant: ZKW GROUP GMBH, Wieselburg (AT)

(72) Inventor: Martin Lahmer, Münichreith (AT)

(73) Assignee: ZKW Group GmbH, Wieselburg (AT)

( * ) Notice: Subject to any disclaimer, the term of this patent is extended or adjusted under 35 U.S.C. 154(b) by 392 days.

(21) Appl. No.: 16/637,629

(22) PCT Filed: Jul. 24, 2018

(86) PCT No.: PCT/AT2018/060158
§ 371 (c)(1),
(2) Date: Feb. 7, 2020

(87) PCT Pub. No.: WO2019/028483
PCT Pub. Date: Feb. 14, 2019

(65) Prior Publication Data
US 2020/0215963 A1     Jul. 9, 2020

(30) Foreign Application Priority Data
Aug. 10, 2017 (AT) .............................. A 50668/2017

(51) Int. Cl.
*B60Q 1/08* (2006.01)
*F21S 41/67* (2018.01)
(Continued)

(52) U.S. Cl.
CPC .......... *B60Q 1/085* (2013.01); *B60Q 1/1407* (2013.01); *F21S 41/153* (2018.01); *F21S 41/67* (2018.01)

(58) Field of Classification Search
CPC ................ B60Q 1/085; B60Q 2400/50; B60Q 2300/112; B60Q 2300/42; B60Q 1/08
See application file for complete search history.

(56) References Cited

U.S. PATENT DOCUMENTS

2004/0218401 A1   4/2004   Okubo et al.
2004/0114379 A1*   6/2004   Miller .................... B60Q 1/085
                                               362/465

(Continued)

FOREIGN PATENT DOCUMENTS

DE   102010048659 A1   4/2012
EP        2772682 A2   9/2014
FR        3008477 A1   1/2015

OTHER PUBLICATIONS

International Preliminary Report on Patentability for PCT/AT2018/060158, dated Nov. 14, 2018 (4 pages).
(Continued)

*Primary Examiner* — Wei (Victor) Y Chan
(74) *Attorney, Agent, or Firm* — Eversheds Sutherland (US) LLP (57) ABSTRACT

Vehicle headlamp (1), which is designed to form a light pattern in front of a vehicle, comprising a first microprocessor (100), a first memory (110), a control-channel control unit (120) and a first light module (211, 212) with in each case a first output unit (221, 222), and a second light module (213, 214) with in each case a second output unit (223, 224), wherein the vehicle headlamp (1) also comprises an object-channel control unit (130), a second microprocessor (101) and a second memory (90), and the object-channel control unit (130) is designed to receive a message concerning an object channel (131) from a second electronic system (61) of the vehicle and the second microprocessor (101) is designed to at least partially retrieve the message from the object-channel control unit (130) and use it to form image data, and the second microprocessor (101) is also designed to activate the output unit (223, 224) of the second light module (213, 214) by way of a video channel (250), wherein the output unit (223, 224) of the second light module (213, 214) is designed to produce from the control data and the image data (Continued)

of the second light module (213, 214) common data that describe a distribution of the light of a vehicle headlamp.

13 Claims, 4 Drawing Sheets

(51) Int. Cl.
*F21S 41/153* (2018.01)
*B60Q 1/14* (2006.01)

(56) References Cited

U.S. PATENT DOCUMENTS

| | | |
|---|---|---|
| 2016/0114720 A1 | 4/2016 | Schlaug et al. |
| 2016/0159281 A1 | 6/2016 | Jang et al. |
| 2017/0106793 A1 | 4/2017 | Kumar et al. |
| 2017/0144591 A1 | 5/2017 | Yatsu |
| 2017/0192224 A1 | 6/2017 | Logiudice et al. |

OTHER PUBLICATIONS

Search Report for Austrian Patent Application No. 50668/2017, dated Mar. 20, 2018 (1 page).

\* cited by examiner

VEHICLE HEADLAMP AND VEHICLE CONTROL

The invention relates to a vehicle headlamp, which is designed to form a light pattern in front of a vehicle, comprising a first microprocessor, a first memory, a control-channel control unit, and at least one first light module, with in each case a first output unit, and at least one second light module, with in each case a second output unit, wherein the first microprocessor is connected to the first memory and the control-channel control unit,
and the control-channel control unit communicates with the respective output unit of the at least one first and second light module for purposes of data exchange,
and the control-channel control unit is designed so as to receive at least one control message from a first electronic system of the vehicle by way of a control channel, and to forward it at least partially to the first microprocessor, which forms control data by means of parts of the at least one control message, and with the control data controls at least one operating mode of the vehicle headlamp,
and the first microprocessor is designed so as to call up and process first light data, which are stored in the first memory, and to transmit them to the respective output unit of the at least one first and second light module, wherein the first and second output unit is in each case designed to drive an optoelectronic component, connected to the respective output unit, by means of the first light data,
and the at least one first light module is designed to modulate the light emitted by a first light source at least partially in the direction of an at least one first projection optical system by means of a modulator, and to project a first light pattern in front of the vehicle,
and the at least one second light module comprises at least one second light source, an optoelectronic component in which a plurality of controllable optical elements, which are electronically controlled by the associated output unit, are arranged, and comprises at least one second projection optical system, and at least one second light module is designed to direct the light emitted by the second light source to the optical elements of the optoelectronic component, and by means of the optical elements to modulate the light at least partially in the direction of the at least one second projection optical system, and to project a second light pattern in front of the vehicle.

The invention also relates to a vehicle control.

In the development of current headlamp systems, the focus is increasingly on the desire to be able to project as high a resolution light pattern onto the road surface as possible, which can be altered quickly and adapted to the respective traffic, road and lighting conditions. The term "road surface" is used here for the sake of simplification, because it naturally depends on local conditions as to whether a light pattern is actually located on the road surface or extends beyond it. In principle, the light pattern, in the sense used here, is defined by means of a projection onto a vertical surface in accordance with the relevant standards relating to motor vehicle lighting technology. Furthermore, the generated light pattern should be adaptable to different traffic situations.

Among other things, headlamps have been developed in which a variably controllable reflector surface is formed from a plurality of micromirrors, and reflects light emission, which is generated by a light source unit, onto selected regions in the direction of the headlamp beam. Such lighting devices are advantageous in vehicle construction on account of their very flexible light functions, since the illumination intensity can be individually controlled for different lighting regions, and any light functions can be implemented with different light distributions, such as a dipped beam light distribution, a cornering light distribution, a city light distribution, a motorway light distribution, a bend light distribution, a main beam light distribution, an auxiliary main beam light distribution, or for purposes of forming a glare-free main beam (also known as an "adaptive driving beam headlamping system", ADB).

For the micromirror arrangement, the so-called "digital light processing" (DLP®) projection technology is used, in which patterns are generated by modulating a digital pattern onto a light beam. Here, a rectangular arrangement of movable micromirrors, also known as pixels, splits the light beam into sub-regions, and then reflects it pixel by pixel, either into, or out of, the projection path. The basis for this technology is an electronic component, which contains an arrangement of micromirrors in the form of a matrix of mirrors and their control technology, and is known as a "digital micromirror device" (DMD). A DMD microsystem takes the form of a "spatial light modulator" (SLM), which consists of micromirror actuators arranged in a matrix, that is to say, tiltable reflecting surfaces, for example with an edge length of approx. 16 µm, or even less. The mirror surfaces are designed such that they can be moved by the effects of electrostatic fields. Each micromirror is individually adjustable in its tilt angle, and usually has two stable end states, between which it can be alternated at up to 5,000 times per second. The individual micromirrors can in each case be controlled, for example, by pulse width modulation (PWM), so as to image other states of the micromirrors in the main beam direction of the DMD arrangement, whose time-averaged reflectivity lies between the two stable states of the DMD. The number of mirrors corresponds to the resolution of the projected pattern, wherein one mirror can represent one or a plurality of pixels. Nowadays DMD chips with high resolutions in the megapixel range can be obtained. The technology underlying the adjustable individual mirrors is "micro-electromechanical systems" (MEMS) technology.

While the DMD technology has two stable mirror states, and the reflection factor can be adjusted by modulation between the two stable states, "analogue micromirror device" (AMD) technology has the property that the individual mirrors can be set in variable mirror positions, each of which is in a stable state.

In the case of high-resolution vehicle headlamps, it may be necessary to calculate and/or store complex and detailed light distributions, which are, for example, projected by a DMD system, within the electronics of the headlamp. This often requires a high-performance microelectronics module, which, as a complex system, requires increased power consumption and an elaborate cooling system, which requires a large installation space, and also leads to high weight, and high development, installation and maintenance costs, making integration into a vehicle more difficult.

It is the object of the invention to overcome the disadvantages cited.

The object is achieved by means of a vehicle headlamp of the type cited above, wherein the vehicle headlamp further comprises an object-channel control unit, a second microprocessor, and a second memory, wherein the second microprocessor is connected to the object-channel control unit and the second memory for purposes of data exchange, and the object-channel control unit is designed to receive at least one message, by way of an object channel, from a second electronic system of the vehicle, and the second microprocessor is designed to retrieve at least partially the at least one message from the object-channel control unit and to form image data from the latter,
and the second microprocessor is furthermore designed to drive, by way of a video channel, the respective output unit of the at least one second light module, wherein the output unit of the at least one second light module is designed to generate, from the control data and from the image data of the at least one second light module, common data, which describe a light distribution of a vehicle headlamp.

For better understanding and readability of the description and the claims, no distinction is made between a feature in the singular and plural. Nevertheless, the features, or any combinations of the latter, are in each case meant in the singular as a feature.

The features cited make it possible to calculate a detailed description of a light distribution for a vehicle headlamp in a computing unit, which is not located in the headlamp.

Preferably, this computing unit is also used jointly by other vehicle systems for computation tasks. The volume of data resulting from the description of the calculated light distribution is often too large to be transmitted quickly by way of the control channel of a vehicle system. Real-time requirements of control channel messages can make the control channel unsuitable for transmitting such large amounts of data. The inventive object channel creates an additional transmission channel between an electronic system of the vehicle and the vehicle headlamp, which has a large transmission bandwidth for messages, and which can also be configured for real-time transmission, for example by applying a real-time protocol in the transmission channel of the object channel.

It is beneficial if the first electronic vehicle system is an on-board control unit, and/or the second electronic vehicle system is a central driver assistance system, since these systems comprise numerous sensors and control devices, which can generate data, which in turn can be used by the inventive headlamp. As a result, the headlamp can have a less complex design, and lower weight, size, development, and manufacturing costs.

Furthermore, it is beneficial if the at least one first light module and/or the at least one second light module is a controllable, matrix-form arrangement of light-emitting diodes or micromirrors, wherein the at least one second light module has a higher image resolution than the at least one first light module. This makes it possible to create a vehicle headlamp that combines at least two controllable light distributions, each with a different image resolution, in a particularly beneficial way so as to form a single headlamp.

Moreover, it is beneficial if the first and/or second memory stores the first and/or second light data, which comprises at least one light function with in each case a predefined light distribution of the vehicle headlamp, and/or predefined graphic symbols, and preferably if the first and/or second light data have been partially received by the first and/or second electronic vehicle system. This makes it possible to ensure that basic light distributions of the vehicle headlamp, such as a dipped beam or a main beam light distribution, are already programmed into the headlamp during production of the headlamp, for example in the form of a light matrix, whose values represent a light distribution, and the number of light matrix elements corresponds to the number of controllable optical elements of the optoelectronic component, such as a DMD; this light matrix is programmed into the headlamp and does not have to be calculated. However, provision can also be made for the light distribution to be achieved only by means of an analytical description of a profile of a light distribution, for example by means of a polynomial, and for only the parameters of the polynomial to be stored in the memory, so as to save memory. In this case a light matrix can be calculated from the polynomial by the microprocessor, and can be outputted to the DMD by way of the output unit.

In a development of the invention provision can be made for the message preferably to be transmitted using TCP ("transmission control protocol") or UDP ("user datagram protocol") technology by way of the object channel, which is a branch of an Ethernet network, a branch of a real-time Ethernet network, preferably according to the precision time protocol, or a MOST bus ("media oriented systems transport"). This makes it possible to implement the object channel particularly easily, and at the same time to achieve beneficial transmission characteristics.

It is advantageous if the control-channel is a CAN-bus ("controller area network") of a vehicle. This makes it possible to ensure that the control of the light functions or operating modes of the headlamp is carried out using a standardised method, and that no individual adaptation of the control to the invention is required.

It is particularly beneficial if the message comprises at least one destination address, at least one object identification and at least one object description, and the object-channel control unit comprises at least one receive identifier, which corresponds to the destination address and is preferably an IP address ("internet protocol"). By this means, a particularly simple implementation can be achieved.

Furthermore, it is particularly advantageous if the microprocessor is designed so as to form at least one light matrix from the object description, which represents a light distribution of a vehicle headlamp. By this means, a particularly simple implementation of the invention can be achieved.

It is advantageous if the object description itself comprises a light matrix. This also makes it possible to achieve a particularly simple implementation of the invention, in that little or no processing or calculations are requiring by the microprocessor, for example by the conversion of models to describe light distributions.

A preferred development of the invention is formed by a vehicle control comprising at least one inventive vehicle headlamp, wherein the first and second electronic systems dynamically determine a light distribution, which is transmitted in the form of a message to the vehicle headlamp by way of the object channel. This makes it possible to ensure that the light distribution is formed by the electronic system, which, for example, is also designed as a common unit for other vehicle systems, such as a navigation system.

Furthermore, it is beneficial if the first and second electronic systems comprise at least one sensor, which is designed to record sensor data, and from these to determine at least one light distribution. By this means it can be ensured that the light distribution can be adapted to events detected by sensors, and, for example, can include dynamic optical signalling.

It is particularly beneficial if the sensor is a camera sensor, an infrared sensor, an ultrasonic sensor, a radar sensor, a position sensor of a satellite navigation system, a motion sensor, an acceleration sensor, a wheel sensor or a magnetic field sensor, since sensors already present in a vehicle can often be used together for the inventive electronic system.

A particularly preferred development of the invention comprises a recognition system, which is designed to determine recognition data of an opening means of the vehicle, preferably a vehicle key, in particular a radio vehicle key, which indicate a user of the vehicle, and from the recognition data personalised data, preferably at least one personalised image or video, are determined for the user, which are transmitted by means of the message by way of the object channel to the vehicle headlamp for projection as a light pattern in front of the vehicle. This makes it possible, for example, to project information individually configured for the user of the vehicle, or elements of a vehicle infotainment system, as a second light pattern in front of the vehicle.

The invention and its advantages are described in more detail in what follows with the aid of non-restrictive example of embodiments, which are illustrated in the appended figures. In the figures.

With reference to FIGS. 1 to 9, examples of embodiment of the invention are now explained in more detail. In particular, parts important for the invention are shown in a headlamp, wherein it is clear that a headlamp contains many other parts, not shown, which enable useful deployment in a motor vehicle, such as in particular a passenger car or a motorcycle. For the sake of clarity, cooling devices for components, other optical elements, mechanical adjustment devices, or mountings, are therefore not shown.

In order to improve the legibility of the description and claims, an explicit mention of "at least one" feature has been omitted in a number of places. Nevertheless, the feature should be used in both a singular and a plural occasion of the feature. Consequently, these two variants are included in the description and claims, even though not every feature is explicitly cited in the plural.

Figure 1:
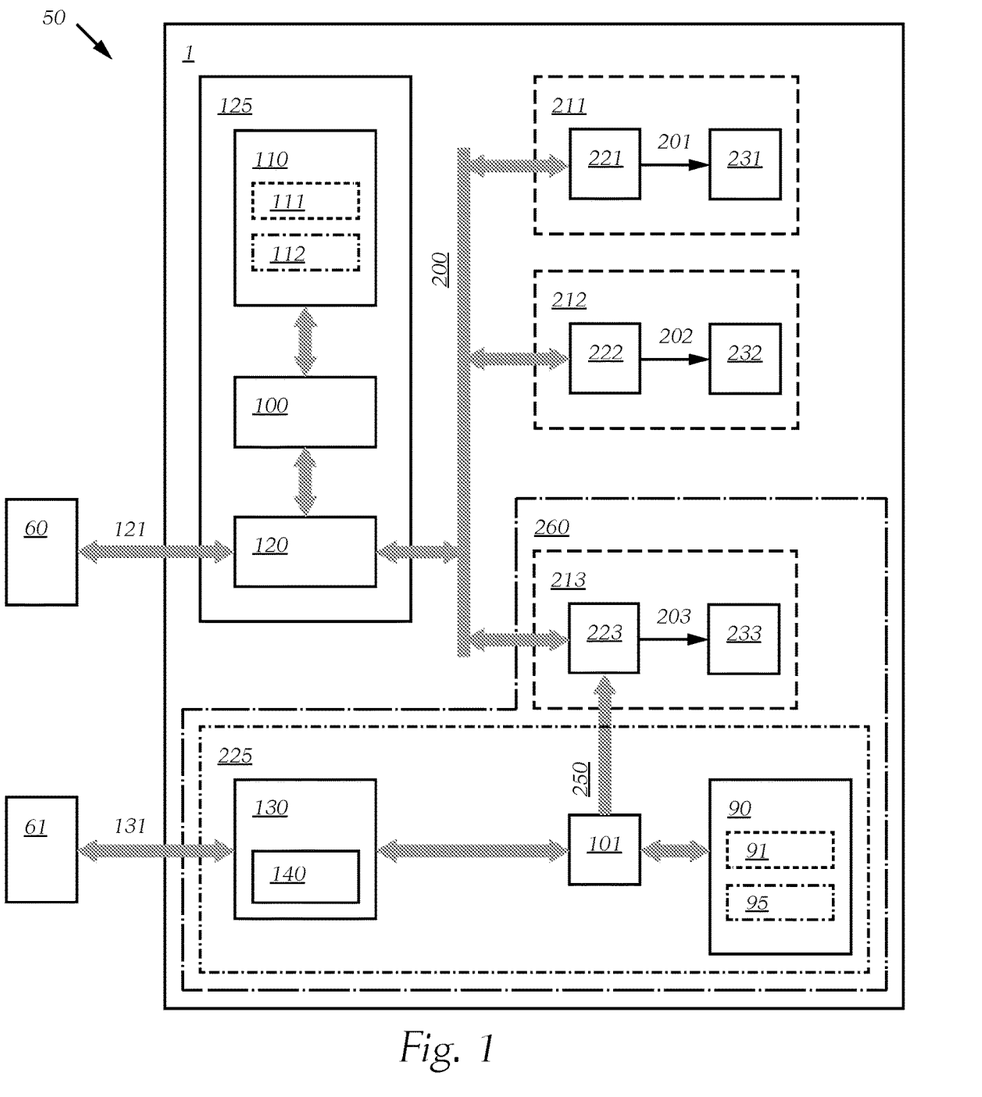
FIG. 1 shows a block diagram of a form of embodiment of an inventive electronics architecture.

FIG. 1 shows an execution of embodiment of a vehicle headlamp 1, which is designed so as to form a light pattern in front of a vehicle, comprising a first microprocessor 100, a first memory 110, a control-channel control unit 120, and first light modules 211, 212, in each case with a first output unit 221, 222, and a second light module 213 with a second output unit 223.

The first microprocessor 100 is connected to the first memory 110 and the control-channel control unit 120.

The control-channel control unit 120, for purposes of data exchange, communicates with the respective output unit 221, 222, 223 of the first and second light modules 211, 212, 213. This communication can take place by way of an internal headlamp bus 200, which can, for example, be a CAN bus. Alternatively, communication can also take place by way of a serial interface, for example.

The control-channel control unit 120 is designed so as to receive at least one control message from a first electronic system 60 of the vehicle by way of a control channel 121, and to forward it at least partially to the first microprocessor 100, which forms control data by means of dividing the control message, and with the control data controls at least one operating mode of the vehicle headlamp 1.

The control data can be used, for example, to control a headlamp levelling device, or a heating element of a vehicle headlamp, but also to drive a light function for a direction indicator, a main beam, a cornering light, a signal light, a dipped beam, or similar.

The first microprocessor 100 is designed so as to call up and process first light data 111, 112, which are stored in the first memory 110, and to transmit them to the respective output unit 221, 222, 223 of the first and second light modules 211, 212, 213, wherein the first and second output unit 221, 222, 223 are in each case designed so as to drive an optoelectronic component 231, 232, 233, connected to the respective output unit 221, 222, 223, by means of the first light data 111, 112. The output unit 221, 222, 223 can be an electronic driver circuit, which is specifically adapted to drive an optoelectronic component.

The first light module 211, 212 is designed so as to modulate the light emitted by a first light source at least partially in the direction of at least one first projection optical system by means of a modulator, and to project a first light pattern in front of the vehicle. The first light source can, for example, be formed by a matrix-form arrangement of LEDs, and their modulation can be achieved, for example, by individual control of the respective light intensity, such as by PWM (pulse-width modulation). Alternatively, the first light source can also be a conventional fog lamp, which has only one switched-on and one switched-off operating state.

Figure 3:
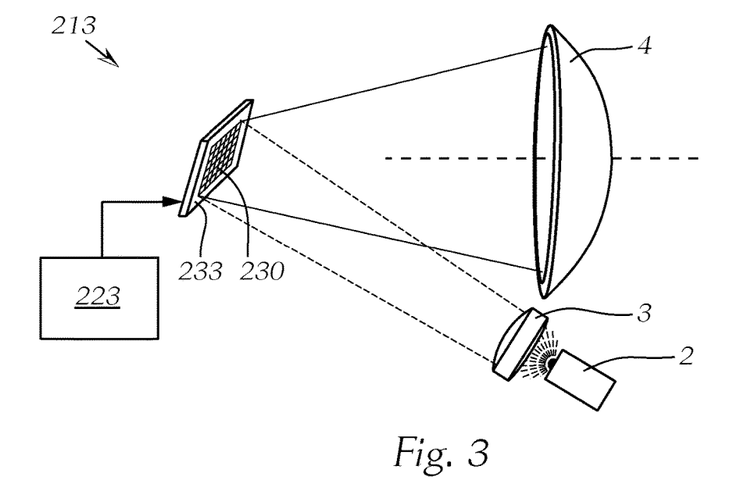
FIG. 3 shows a representation in perspective of a first form of embodiment of an arrangement of components of a vehicle headlamp according to the invention.
Figure 4:
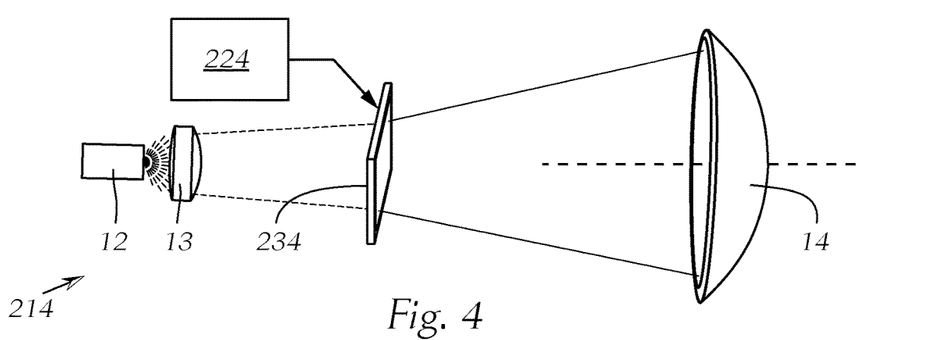
FIG. 4 shows a representation in perspective of a second form of embodiment of an arrangement of components of a vehicle headlamp according to the invention.

As can be discerned from FIGS. 3 and 4, the second light module 213 comprises at least one second light source 2, 12, an optoelectronic component 233, 234, in which are arranged several controllable optical elements 230, which are electronically controlled by the respective associated output unit 223, 224, and at least one second projection optical system 4, 14, and the at least one second light module 213,214 is arranged to direct the light emitted by the second light source 2, 12 to the optical elements 230 of the optoelectronic component 233, 234, and by means of the optical elements 230 to modulate the light at least partially in the direction of the at least one second projection optical system 4, 14, and to project a second light pattern in front of the vehicle. The optoelectronic component 233, 234 of the second light module 213, 214 can, for example, be a micromirror arrangement in the form of a DLP® chip, which can selectively reflect incident light.

The vehicle headlamp 1 further comprises an object-channel control unit 130, a second microprocessor 101, and a second memory 90, wherein the second microprocessor 101 is connected to the object-channel control unit 130 and the second memory 90 for purposes of data exchange.

The object-channel control unit 130 is designed to receive at least one message 500 from a second electronic system 61 of the vehicle by way of an object channel 131, and the second microprocessor 101 is designed to retrieve at least partially the at least one message 500 from the object-channel control unit 130, and to form image data from the latter.

The second microprocessor 101 is also designed to drive the respective output unit 223, 224 of the at least one second light module 213, 214 by way of a video channel 250, wherein the output unit 223, 224 of the at least one second light module 213, 214 is designed to generate, from the control data and from the image data of the second light module 213, common data that describe a light distribution 400 of a vehicle headlamp. For example, the video channel 250 can comply with the HDMI standard ("high definition multimedia interface"), and can comprise a video stream in accordance with the H.264 standard for purposes of video compression.

In this example of embodiment, the first electronic vehicle system 60 is an on-board electrical control unit, and/or the second electronic vehicle system 61 is a central driver assistance system.

The first light modules 211, 212, and/or the second light module 213, have a controllable, matrix-form arrangement of light-emitting diodes or micromirrors, wherein the second light module 213 has a higher image resolution than the first light modules 211, 212.

The first light modules 211, 212 can therefore be controlled by way of the control channel 121, which has a low transmission capacity but can nevertheless transmit objects with a low data volume, such as simple graphic symbols generated dynamically by the first and/or second electronic vehicle system 60, 61.

The second light module 213 can therefore be controlled by way of the object channel 131, which has a high transmission capacity, and can transmit objects with a high data volume, such as detailed, complex graphic symbols generated dynamically by the first and/or second electronic vehicle system 60, 61.

The first and/or second memory 90, 110 stores the first and/or second light data 91, 92, 111, 112, which comprise at least one light function with in each case a predefined light distribution 300, 301 of the vehicle headlamp 1, and/or predefined graphic symbols 400, and preferably the first and/or second light data 91, 111 have been partially received by the first and/or second electronic vehicle system 60, 61.

Thus, parts of the first and/or second light data 91, 111 can be stored statically in the first and/or second memory 90, 110, that is to say, permanently programmed into the headlamp 1 in the course of production, and other parts of the first and/or second light data 92, 112 can be stored dynamically in the first and/or second memory 90, 110, that is to say, during operation of the headlamp 1 they can be received by the first and/or second electronic vehicle system 60, 61, and/or calculated or processed by the first and/or second microprocessor 100, 101. Dynamically stored first and/or second light data 92, 112 are therefore only temporarily stored during operation of the headlamp 1.

The first microprocessor 100, the first memory 110 and the control-channel control unit 120 form a headlamp control unit 125, which can form a separate electronic unit within the headlamp 1. Within the electronic unit, for example, it may be necessary to provide complex and expensive printed circuit boards, so it may make sense to design this electronic unit as a separate module.

The first and second microprocessors 100, 101 and/or the first and second memories 90, 110 can each consist of a plurality of discrete semiconductor components, or they can be formed by a common processor component and a common memory, which is also integrated on the common processor component. Thus, for example, parallel processes or even virtual processors can run on the common processor component, and the memory of the processor component can be divided into several regions, which are assigned to the respective parallel processes or virtual processors.

Alternatively, a headlamp control unit 225, as shown in FIG. 1, can be provided, which comprises the second microprocessor 101, the second memory 90, and the object-channel control unit 130, and forms a separate unit within the headlamp 1.

In addition, a light module 260 can be provided, which, together with the headlamp control unit 225 and the second light module 213, forms a separate unit within the headlamp 1. This modular concept makes it possible to provide a basic headlamp, in which the light module 260 can be supplemented as required, and costs can be reduced thanks to the variable configurability of the headlamp. Embodiment variants of the invention make it possible to create a highly modular configuration of the vehicle headlamp.

The object channel can be a network communication medium, and can use, for example, a protocol in accordance with the Ethernet or the MOST bus standard, thereby physically transmitting the object data in LVDS technology ("low voltage differential signalling").

Figure 2:
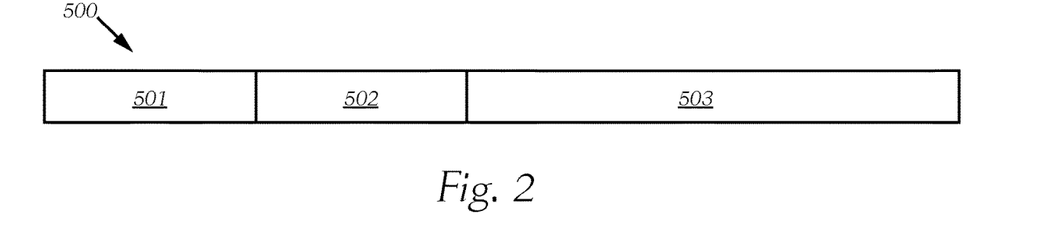
FIG. 2 shows a representation of a message.

The object channel 131 can be used to create a large transmission bandwidth for messages 500, as shown in FIG. 2, which can in addition be configured for real-time transmission, for example by adopting a real-time protocol in the object channel 131. For this purpose, the message 500 can preferably be transmitted using TCP or UDP technology by way of the object channel 131, which is a branch of an Ethernet network, a branch of a real-time Ethernet network, preferably in accordance with the precision time protocol, or a MOST bus.

The light data 91, 95, 111, 112 can, in the course of manufacture of the vehicle headlamp 1, be stored in the first and/or second memory 90, 110 in a form such that the first and/or second microprocessor 100, 101 does not have to execute any additional processing or calculation, and the light data 91, 95, 111, 112 can be outputted directly to the respective output unit 221, 222, 223. The second output unit 223 is additionally designed to receive data from both the first microprocessor 100 and the second microprocessor 101, for example by way of the headlamp bus 200 and the video channel 250, and to combine these data and display them in the form of a common light pattern by way of the optoelectronic component 233.

The control channel 121 can be a CAN bus.

A vehicle control 50 comprises the at least one vehicle headlamp 1 and a first and a second electronic system 60, 61, wherein the first and second electronic systems 60, 61 dynamically determine a light distribution 400 (see FIG. 9), which can be transmitted in the form of a message 500 to the vehicle headlamp 1 by way of the object channel 131.

The first and/or second electronic systems 60, 61 comprise at least one sensor, which is designed to record sensor data, and from the latter determines at least one light distribution 400.

The sensor can be a camera sensor, an infrared sensor, an ultrasonic sensor, a radar sensor, a position sensor of a satellite navigation system, a motion sensor, an acceleration sensor, a wheel sensor, or a magnetic field sensor.

It also includes a recognition system, which is designed to determine recognition data of an opening means of the vehicle, which indicate a user of the vehicle. From the detection data, personalised data, preferably at least one personalised image or video, can be determined for the user, which is transmitted by means of the message 500 by way of the object channel 131 to the vehicle headlamp 1, for purposes of projection as a light pattern in front of the vehicle.

The means of opening the vehicle can be a mechanical or an electronic key. Radio vehicle keys are particularly suitable for electronic keys, for example in RFID technology or in the form of active transponders, since a plurality of individual user identifications can easily be implemented for the same vehicle. Alternatively, optical recognition systems that can, for example, detect the faces or fingerprints of vehicle users, can also be used.

The vehicle headlamp 1 may also comprise a plurality of headlamp buses, for example a serial bus, by way of which an object-channel control unit is connected to the microprocessor.

A plurality of components of the vehicle headlamp 1, for example the microprocessor 100, the memory 110, the control-channel unit 120 and the DMA control unit, can be integrated within a semiconductor chip or a chip package, for example as SoC ("system on chip") or SiP ("system in package").

An example of embodiment of the at least one message 500 is shown in FIG. 2, which comprises at least one destination address 501, at least one object identification 502, and at least one object description 503. The object-channel control unit 130, as shown in FIG. 1, may include at least one receive identifier 140, which corresponds to the at least one destination address 501, and is preferably an IP address. The microprocessor 100 is designed to form from the object description 503 at least one light matrix 201, 202, which represents a light distribution of a vehicle headlamp.

The object address 501 and the receive identifier 140 can, for example, be an address "10.0.0.123" in 1Pv4 network format.

The object description or the object attribute 503 can itself comprise a light matrix.

FIG. 3 shows a first form of embodiment of a module or device in the form of a light module 213 of the vehicle headlamp 1. A light source 2, which may, for example, contain a light-emitting diode or a power LED, together with a primary optical system 3 for focussing a light beam, is designed so as to illuminate an optoelectronic component 233. The primary optical system 3 can comprise a plurality of optical elements, such as lenses.

The optoelectronic component 233 can comprise a plurality of optoelectronic elements 230 arranged in a two-dimensional matrix. In this first example of embodiment, the optoelectronic elements 230 are individually controllable micromirrors in which the reflection effect of each individual element of the matrix is variably adjustable, for example a DMD.

The optoelectronic component 233 can reflect the incident light in the direction of a projection optical system 4, wherein the controlled matrix elements, that is to say, the optoelectronic elements 230, individually adjust their reflection factor by modulation of the angles of the micromirrors, and modulation of a desired light distribution onto the incident light beam. The projection optical system 4 is oriented in the direction of the beam of the vehicle headlamp 1, and generates the desired light distribution in front of the vehicle.

The optoelectronic component 233 is controlled by the output unit 223, wherein the microprocessor 100 can calculate a desired light distribution, or can retrieve the latter from the memory 110, and the output unit 223 outputs the control function of the optoelectronic elements 230 in the form of control signals to the optoelectronic component 233.

FIG. 4 shows a second form of embodiment of a module or device in the form of a light module 214 of a vehicle headlamp 1. A light source 12, which may contain a light-emitting diode, a high-current LED, a power LED, or a laser diode, for example, together with a primary optical system 13 for purposes of focussing the light beam emitted by the light source 12, is designed so as to illuminate an optoelectronic component 234.

The optoelectronic component 234 comprises a plurality of optoelectronic elements arranged in a two-dimensional matrix.

In this second example of embodiment, the optoelectronic elements are individually controllable translucent elements (not shown) in which the light transmission effect of each individual element of the matrix is variably adjustable, for example an LCD.

The optoelectronic component 234 can transmit the incident light in the direction of a projection optical system 14, wherein the controlled matrix elements individually adjust their light transmissibility, and modulate a desired light distribution onto the incident light beam. The projection optical system 14 is oriented in the direction of the beam of the vehicle headlamp 1, and generates the desired light distribution in front of the vehicle.

In addition, the statements made with reference to FIG. 3 apply.

Figure 5:
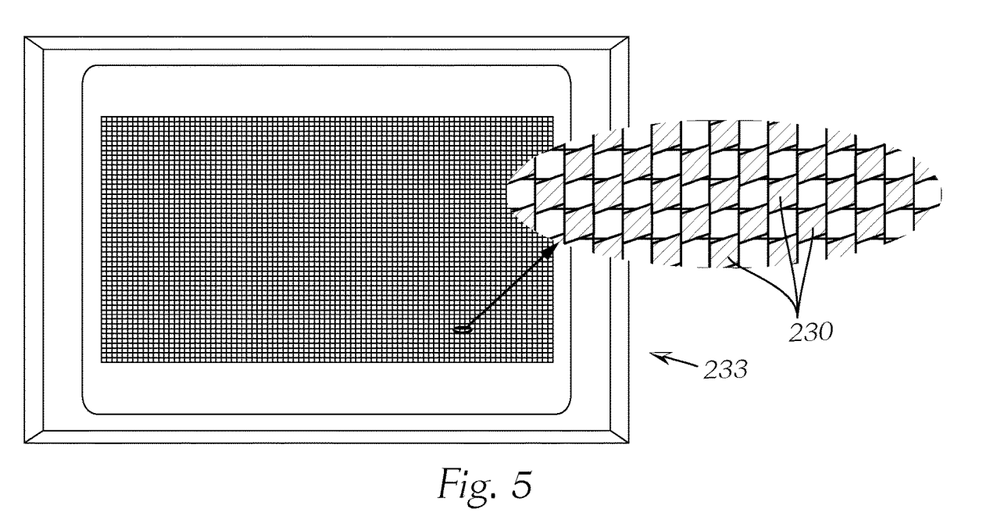
FIG. 5 shows a front view of an optoelectronic component with an enlarged detailed representation of optoelectronic elements contained therein.

FIG. 5 shows in a front view an example of an optoelectronic component 233 in the form of a DMD. An enlarged section of the image shows optoelectronic elements 230 arranged in the form of a matrix, which comprise individually controllable micromirrors, wherein in this example every second micromirror is tilted.

Besides the variants of the optoelectronic components 233, 234 shown in FIG. 3 and FIG. 4, other technologies can, of course, also be used, which enable the light to be modulated accordingly, such as LCoS systems (LCoS, "liquid crystal on silicon").

Figure 6:
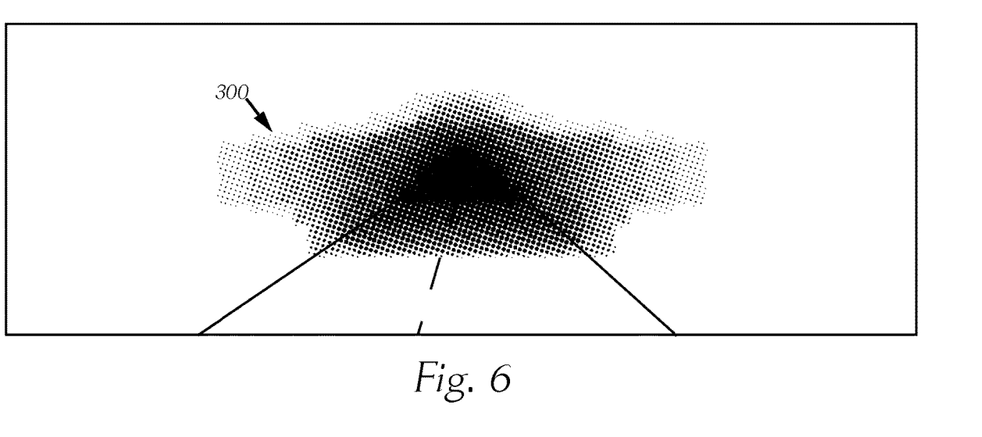
FIG. 6 shows a representation of a main beam light distribution as a projected light pattern in front of a vehicle.
Figure 7:
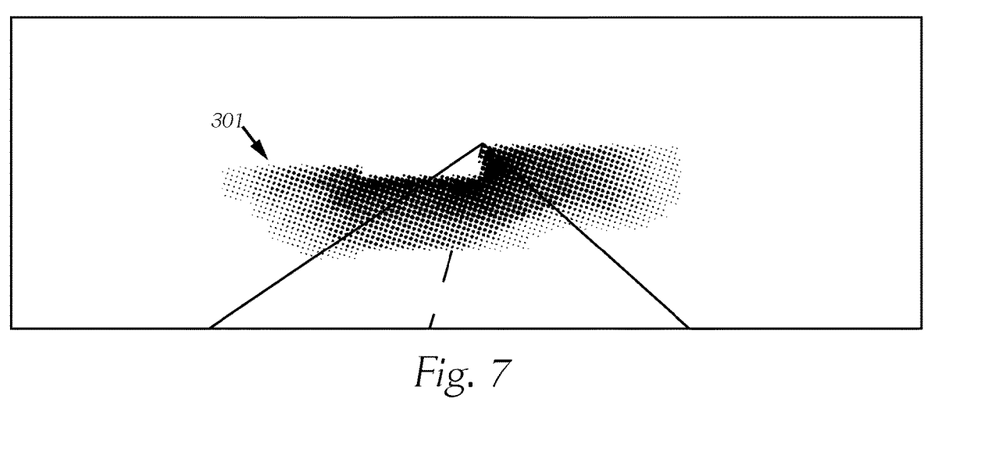
FIG. 7 shows a representation of a dipped beam light distribution as a projected light pattern in front of a vehicle.

Examples of light distributions of the vehicle headlamp 1 are shown by the main beam light distribution 300 and the dipped beam light distribution 301 in FIGS. 6 and 7, as light patterns in front of the vehicle.

Figure 8:
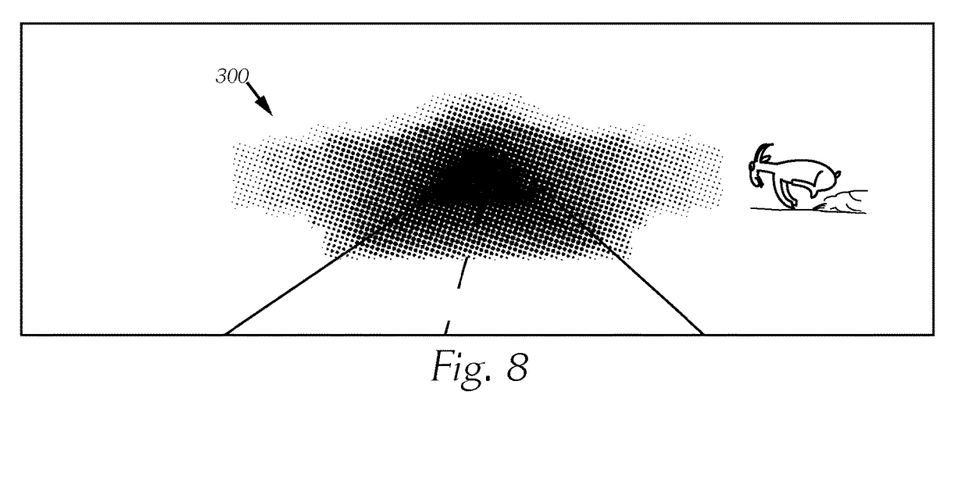
FIG. 8 shows a representation of a main beam light distribution as a projected light pattern in front of a vehicle and a dangerous object.

In FIG. 8 an object, in this example a wild animal, is shown in addition to the main beam light distribution 300 in FIG. 5. One or a plurality of electronic vehicle systems 60, 61 can detect wildlife by means of at least one sensor, which may be a camera sensor, an infrared sensor, an ultrasonic sensor, a radar sensor, a position sensor of a satellite navigation system, a motion sensor, an acceleration sensor, a wheel sensor or a magnetic field sensor. Combined sensors for the detection of situations or moments of danger for the vehicle are also possible, which use a plurality of various sensor technologies simultaneously.

Figure 9:
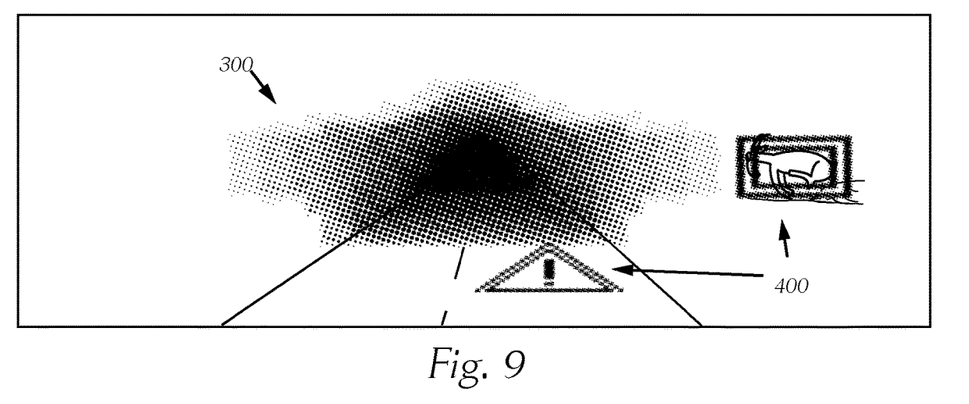
FIG. 9 shows a representation according to FIG. 8, in which a light distribution with warning symbols is additionally projected for the dangerous object.

The object detected by the at least one sensor by means of sensor data, here the wild animal, can be determined by at least the electronic vehicle systems 60, 61, and from the latter at least one light distribution 400 can be determined, as indicated in FIG. 9. The vehicle headlamp 1 can, for example, superimpose two light distributions, the main beam light distribution 300 and a signal light distribution 400 in the form of a hazard warning or a highlighting of the detected hazard, such that, in addition to the basic light function of the vehicle headlamp 1, optical signalling is also combined to form an overall light distribution, which can be projected in front of the vehicle as a light pattern by way of a light module 213.

Alternatively, the vehicle electronic system 60, 61 may further comprise a recognition system, which is designed to determine recognition data of an opening means of the vehicle, indicating a user of the vehicle, and to determine from the recognition data personalised data, preferably at least one personalised image or video, for the user, which is transmitted by means of the message 500 by way of the object channel 131 to the vehicle headlamp 1 for purposes of projection as a light pattern in front of the vehicle. In this way, for example, a user of the vehicle can be individually greeted by an optical projection in front of the vehicle when the vehicle is put into operation.

REFERENCE LIST

1 Vehicle headlamp
2, 12 Light source
3, 13 Primary optical system
4, 14 Projection optical system
Vehicle control
60, 61 Electronic system of the vehicle
100, 101 Microprocessor
90, 110 Memory
91, 111 Dynamic light data
95, 112 Static light data
120 Control-channel control unit
121 Control channel
125, 225 Headlamp control unit
130 Object-channel control unit
131 Object channel
140 Receive identifier
200 Headlamp bus
201, 202, 203 Light matrix
211, 212, 213, 214 Light module
221, 222, 223, 224 Output unit
230 Controllable optical element
231, 232, 233, 234 Optoelectronic component
250 Video channel
260 Light module
300, 301, 400 Light distribution
500 Message
501 Destination address
502 Object identification
503 Object attribute or object description

The invention claimed is:

1. A vehicle headlamp (1), which is configured to form a light pattern in front of a vehicle, the vehicle headlamp comprising: a first microprocessor (100); a first memory (110); a control-channel control unit (120); at least one first light module (211, 212) with a first output unit (221, 222); and at least one second light module (213, 214) with a second output unit (223, 224), wherein: the first microprocessor (100) is connected to the first memory (110) and the control-channel control unit (120), the control-channel control unit (120) communicates with the respective output unit (221, 222, 223) of the at least one first and second light module (211, 212, 213, 214) for purposes of data exchange, the control-channel control unit (120) is configured to receive at least one control message from a first electronic system (60) of the vehicle by way of a control channel (121), and to forward the control message at least partially to the first microprocessor (100), which by means of parts of the at least one control message forms control data, and with the control data controls at least one operating mode of the vehicle headlamp (1), the first microprocessor (100) is configured to retrieve and process first light data (111, 112), which are stored in the first memory (110), and to transmit the first light data to the respective output unit (221, 222, 223, 224) of the at least one first and second light module (211, 212, 213, 214), wherein the first and second output unit (221, 222, 223, 224) is configured to drive an optoelectronic component (231, 232, 233, 234) connected to the respective output unit (221, 222, 223, 224) by means of the first light data (111, 112), the at least one first light module (211, 212) is configured to modulate the light emitted from a first light source at least partially in the direction of at least one first projection optical system by means of a modulator, and to project a first light pattern in front of the vehicle, the at least one second light module (213, 214) comprises at least one second light source (2, 12), an optoelectronic component (233, 234) in which a plurality of controllable optical elements (230), which are electronically driven by the associated output unit (223, 224), are arranged, and at least one second projection optical system (4, 14) and the at least one second light module (213, 214) is configured to direct the light emitted by the second light source (2, 12) to the optical elements (230) of the optoelectronic component (233, 234), and to modulate the light at least partially by means of the optical elements (230) in the direction of the at least one second projection optical system (4, 14), and to project a second light pattern in front of the vehicle, the vehicle headlamp (1) further comprises an object-channel control unit (130), a second microprocessor (101), and a second memory (90), wherein the second microprocessor (101) is connected to the object-channel control unit (130) and the second memory (90) for purposes of data exchange, the object-channel control unit (130) is configured to receive at least one message (500) from a second electronic system (61) of the vehicle by way of an object channel (131) and the second microprocessor (101) is configured to retrieve at least partially the at least one message (500) from the object-channel control unit (130), and to form image data from the message (500), and the second microprocessor (101) is further configured to drive the respective output unit (223, 224) of the at least one second light module (213, 214) by way of a video channel (250), wherein the output unit (223, 224) of the at least one second light module (213, 214) is configured to generate common data from the control data and from the image data of the at least one second light module (213, 214), which common data describe a light distribution (400) of a vehicle headlamp.

2. The vehicle headlamp (1) according to claim 1, wherein the first electronic vehicle system (60) is an on-board electrical system control unit and/or the second electronic vehicle system (61) is a central driver assistance system.

3. The vehicle headlamp (1) according to claim 1, wherein the at least one first light module (211, 212) and/or the at least one second light module (213, 214) is a controllable, matrix-form arrangement of light-emitting diodes or micromirrors, wherein the at least one second light module (213, 214) has a higher image resolution than the at least one first light module (211, 212).

4. The vehicle headlamp (1) according to claim 1, wherein the first and/or second memory (90, 110) stores the first and/or second light data (91, 92, 111, 112), which comprise at least one light function with a respective predefined light distribution (300, 301) of the vehicle headlamp (1), and/or predefined graphic symbols (400), and the first and/or second light data (91, 111) have been partially received by the first and/or second electronic vehicle system (60, 61).

5. The vehicle headlamp (1) according to claim 1, wherein the message (500) is transmitted using TCP or UDP technology by way of the object channel (131), which is a branch of an Ethernet network, a branch of a real-time Ethernet network, according to the precision time protocol, or a MOST bus.

6. The vehicle headlamp (1) according to claim 1, wherein the control-channel (121) is a CAN bus.

7. The vehicle headlamp (1) according claim 1, wherein the message (500) comprises at least one description (503), and the object-channel control unit (130) comprises at least one receive identifier (140) which corresponds to the destination address (501), and is an IP address.

8. The vehicle headlamp (1) according to claim 7, wherein the microprocessor (100) is configured to form at least one light matrix (201, 202) from the object description (503), which represents a light distribution of a vehicle headlamp.

9. The vehicle headlamp (1) according to claim 7, wherein the object description (503) comprises a light matrix.

10. A vehicle control (50), comprising at least one vehicle headlamp (1) according to claim 1, wherein the first and second electronic systems (60, 61) are configured to dynamically determine a light distribution (400), which is transmitted in the form of the message (500) to the vehicle headlamp (1) by way of the object channel (131).

11. The vehicle control (50) according to claim 10, wherein the first and second electronic systems (60, 61) comprise at least one sensor, which is configured to detect sensor data, and from the latter determines at least one light distribution (400).

12. The vehicle control (50) according to claim 11, wherein the sensor is a camera sensor, an infrared sensor, an ultrasonic sensor, a radar sensor, a position sensor of a satellite navigation system, a motion sensor, an acceleration sensor, a wheel sensor, or a magnetic field sensor.

13. The vehicle control (50) according to claim 10, wherein the vehicle control further comprises a recognition system, which is configured to determine recognition data of an opening means of the vehicle, preferably a vehicle key, which indicate a user of the vehicle, and from the recognition data personalized data, at least one personalized image or video, are determined for the user, which data is transmitted by means of the message (500) by way of the object channel (131) to the vehicle headlamp (1) for purposes of projection as a second light pattern in front of the vehicle.

* * * * *